(12) United States Patent
Helms et al.

(10) Patent No.: US 8,799,972 B2
(45) Date of Patent: *Aug. 5, 2014

(54) TECHNIQUE FOR EFFECTIVELY UTILIZING LIMITED BANDWIDTH OF A COMMUNICATIONS NETWORK TO DELIVER PROGRAMMING CONTENT

(75) Inventors: William Helms, Longmont, CO (US); Michael T. Hayashi, Evergreen, CO (US); Paul D. Brooks, Weddington, NC (US); Douglas Semon, Denver, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/815,105

(22) Filed: Jun. 14, 2010

(65) Prior Publication Data

US 2010/0245669 A1 Sep. 30, 2010

Related U.S. Application Data

(63) Continuation of application No. 10/983,378, filed on Nov. 8, 2004, now Pat. No. 7,774,818.

(60) Provisional application No. 60/526,621, filed on Dec. 3, 2003.

(51) Int. Cl.
*H04N 7/20* (2006.01)
*H04N 7/18* (2006.01)
*H04N 7/173* (2011.01)

(52) U.S. Cl.
USPC ............... 725/95; 725/68; 725/71; 725/78; 725/86; 725/87; 725/91; 725/98; 725/126

(58) Field of Classification Search
CPC ............ H04N 21/2385; H04N 21/426; H04N 21/434; H04N 21/4347; H04N 21/47202
USPC ........... 725/78, 82, 68, 71, 86, 87, 91, 98, 95, 725/96, 126
See application file for complete search history.

(56) References Cited

U.S. PATENT DOCUMENTS

| 7,730,514 | B1 * | 6/2010 | Zhang et al. ................... 725/119 |
| 7,774,818 | B2 * | 8/2010 | Helms et al. .................... 725/95 |
| 2003/0126610 | A1 * | 7/2003 | Ando ............................... 725/91 |
| 2003/0177499 | A1 * | 9/2003 | Rodolico ......................... 725/80 |
| 2007/0297461 | A1 * | 12/2007 | Takashimizu et al. ........ 370/535 |

* cited by examiner

*Primary Examiner* — Nasser Goodarzi
*Assistant Examiner* — Kyu Chae
(74) *Attorney, Agent, or Firm* — Straub & Pokotylo; Michael P. Straub; Stephen T. Straub

(57) ABSTRACT

To effectively utilize the bandwidth of a cable TV network, which is limited, analog TV program material is digitized and compressed before its transmission over the network. The resulting signals consume only part of the analog TV band traditionally needed for transmission of the analog TV program material. The newly available bandwidth in the analog TV band may be utilized for other cable TV services, e.g., video-on-demand (VOD) services. A reception gateway is employed at a user location to frequency-translate any VOD signals, transmitted through the analog TV band, to another frequency band, thereby avoiding disturbing the normal operation of a set-top terminal in receiving the analog TV program material through the analog TV band at the user location.

20 Claims, 6 Drawing Sheets

*FIG. 7*
590
| TRANSMISSION CHANNEL I.D. | TSID |
|---|---|
| TC-1 | 17 |
| TC-2 | 3 |
| TC-3 | NULL |
592 593
596 { TC-1, TC-2
597 { TC-3
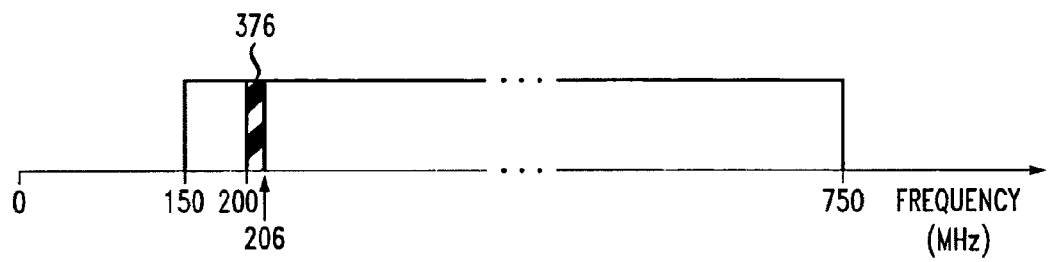
*FIG. 8A*
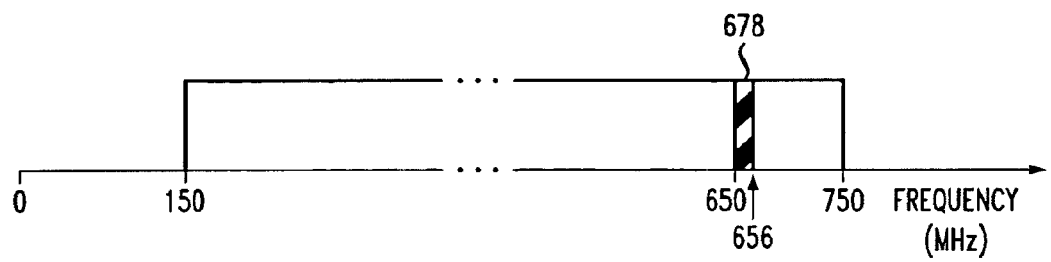
*FIG. 8B*

TECHNIQUE FOR EFFECTIVELY UTILIZING LIMITED BANDWIDTH OF A COMMUNICATIONS NETWORK TO DELIVER PROGRAMMING CONTENT

RELATED APPLICATIONS

The present application is a continuation of U.S. patent application Ser. No. 10/983,378 filed Nov. 8, 2004 which is hereby expressly incorporated by reference in its entirety and which claims under 35 U.S.C. §119(e) the benefit of Provisional Application No. 60/526,621 filed on Dec. 3, 2003.

FIELD OF THE INVENTION

The invention relates to communications systems and methods, and more particularly to a system and method for delivering programming material to subscribers via a communications network, e.g., cable television network.

BACKGROUND OF THE INVENTION

In many existing cable systems, cable operators provide programming material in more than one format. For instance, certain broadcast TV programs may be provided in an analog format, e.g., in accordance with the standards of the National Television System Committee (NTSC). Other broadcast TV programs may be provided in a digital format. One common digital format is the well-known Moving Pictures Experts Group 2 (MPEG-2) format. The MPEG-2 format effects a compression of video and audio data to allow multiple programs, with different video and audio feeds, to be multiplexed into a transport stream traversing a single transmission channel, as opposed to one program per transmission channel in analog TV. A set-top terminal (STT) at the user premises may be used to decode an MPEG-2 encoded transport stream, and extract the desired programming material therefrom.

MPEG-2 Background

In accordance with the MPEG-2 standard, video and audio data associated with a given program is compressed, and carried in the form of packets within a packetized elementary stream (PES). For digital broadcasting, one or more programs and their associated PESs may be multiplexed into a single transport stream. A transport stream has PES packets further subdivided into short fixed-size data packets, which carry encoded video and audio data associated with one or more programs. A transport stream comprises not only a multiplex of audio and video PESs, but also other data such as MPEG-2 metadata describing the transport stream. The MPEG-2 metadata includes a program associated table (PAT) that lists every program in the transport stream. Each entry in the PAT points to a program map table (PMT) that lists the elementary streams making up each program.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counts are implemented to ensure that every packet that is needed to decode a stream is received.

In prior art, analog TV signals, compared with digital TV signals, utilize a relatively large amount of network bandwidth for transmission of the same program material. In many conventional cable systems, a 6 MHz transmission channel may be utilized to transmit a single analog program. In contrast, with the use of a digital compression technique, e.g., the MPEG-2 technique, a 6 MHz transmission channel may accommodate nine or more digital programs at the same time.

SUMMARY OF THE INVENTION

As the number of program channels, and use of on-demand services such as movies-on-demand, subscription VOD services are ever increasing, the cable TV network is constantly strained for additional bandwidth to deliver program channel material and services. The invention is directed to effectively utilizing the limited network bandwidth to meet such increasing needs.

In accordance with the invention, analog signals representing programming material (e.g., analog TV programming material) received by the cable operator are digitized, and compressed before their transmission over the network, to conserve network bandwidth. Advantageously, some of the bandwidth which would otherwise be needed for analog TV broadcast can be made available for other services, such as the VOD services. The resulting digital signals representing the analog TV programming material are transmitted through a first subband in a first frequency band (e.g., the traditional analog TV band) of the communications network. Selected signals (e.g., containing VOD programming material) are transmitted through a second subband in the same analog TV band of the communications network. The first subband and second subband are exclusive of each other.

However, an STT at a user location is programmed to tune to the analog TV band to obtain the analog TV programming material. Thus, without disturbing the normal operation of the STT, in accordance with the invention, a reception gateway which may be installed at the user location, converts the digitized, compressed analog TV programming material to its original analog form, which reoccupies the analog TV band at the user location. In anticipation of the band reoccupation, the reception gateway frequency-translates the selected signals to a second frequency band outside the analog TV band. As a result, by using the reception gateway at the user location in accordance with the invention, the digitization and compression of analog TV programming material in the headend, and use of the analog TV band for transmission of VOD programming material are transparent to the STT.

BRIEF DESCRIPTION OF THE DRAWINGS

Further objects, features and advantages of the invention will become apparent from the following detailed description taken in conjunction with the accompanying drawing showing illustrative embodiments of the invention, in which:

FIG. 7 illustrates a resource table that may be maintained by a resource manager, in accordance with an embodiment of the invention;

FIG. 8A illustrates a transmission channel for transmitting a VOD transport stream in the prior art frequency band for non-VOD services, in accordance with an embodiment of the invention;

FIG. 8B illustrates a frequency subband to which the VOD transport stream is frequency-translated at a user location, in accordance with an embodiment of the invention;

DETAILED DESCRIPTION

Figure 1:
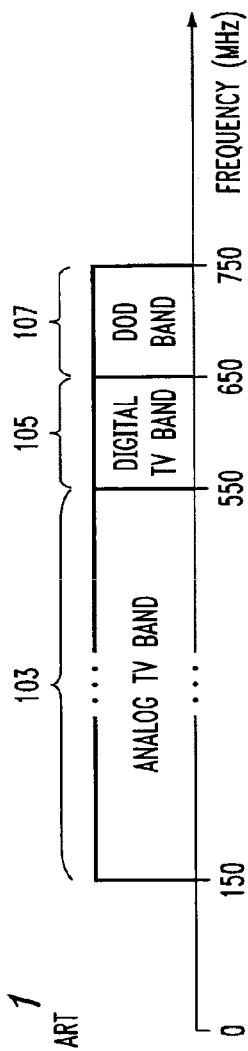
FIG. 1 illustrates an allocation of frequency bands for transmission of different types of programming material in a prior art cable TV system.

In a prior art cable TV system, programming material for various program channels, whether in an analog or a digital format, is transmitted over a multi-channel delivery network, e.g., cable TV network, comprising one or more transmission channels. The terms "transmission channel" and "program channel" used here should not be confused. A "transmission channel" signifies a designated frequency band through which a transport stream containing program material and/or data is transmitted. A transmission channel may comprise, e.g., a 6 MHz frequency band. A "program channel" signifies the source of programming material or the service for a user's consumption. For example, a user may select program channel 2 to view programming material provided by CBS, program channel 14 to view programming material provided by ESPN, etc.

In the prior art, analog program channel material is transmitted via transmission channels within a first designated frequency band, while digital program channel material is transmitted via transmission channels within a second designated frequency band. For example, referring to FIG. 1, a cable operator may transmit analog program channel material via transmission channels populating analog TV band 103, which ranges from, say, 150 MHz to 550 MHz, and digital program channel material via transmission channels populating digital TV band 105, which ranges from, say, 550 MHz to 650 MHz. In addition, some cable operators may designate a third frequency band for transmitting non-broadcast services such as video-on-demand (VOD) services. Such services are typically provided in digital form. In this example, a cable operator may deliver VOD programming material via transmission channels populating digital on-demand (DOD) band 107, which ranges from, say, 650 MHz to 750 MHz.

As the number of program channels, and use of on-demand services such as movies-on-demand, subscription VOD services are ever increasing, the cable TV network is constantly strained for additional bandwidth to deliver program channel material and services. The invention is directed to effectively utilizing the limited network bandwidth to meet such increasing needs. In accordance with the invention, the analog program channel material received by the cable operator is digitized, and compressed, e.g., pursuant to the well known MPEG-2 technique, before its transmission over the network, to conserve network bandwidth. Advantageously, some of the bandwidth which would otherwise be needed for analog TV broadcast can be made available for other services, such as the VOD services.

However, an STT at a user location is programmed to tune to analog TV band 103 to obtain different analog program channel materials. Thus, without disturbing the normal operation of the STT, in accordance with the invention, a reception gateway which may be installed at the user location, converts the digitized, compressed analog program channel material to its original analog form, which reoccupies analog TV band 103 at the user location. In anticipation of such band reoccupation, the reception gateway frequency-translates any non-analog TV program streams containing, e.g., VOD programs, transmitted within analog TV band 103, to another band at the user location (e.g., DOD band 107). As a result, by using the reception gateway at the user location in accordance with the invention, the digitization and compression of analog program channel material in the headend, and use of the analog TV band for transmission of VOD programs are transparent to the STT. That is, as far as the STT is concerned, different types of program are transmitted according to the prior art frequency band allocation, as illustrated in FIG. 1.

Figure 2:
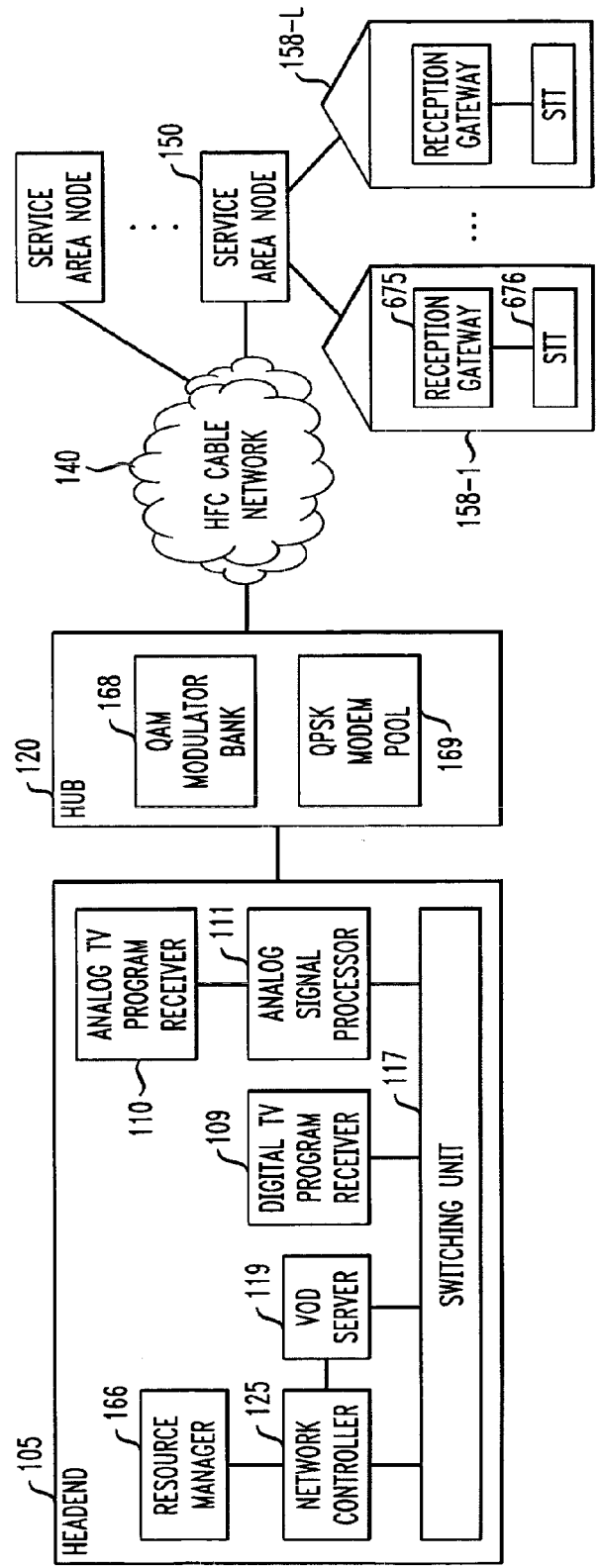
FIG. 2 illustrates a broadband communications system, in accordance with an embodiment of the invention.

FIG. 2 illustrates broadband communications system 100, e.g., a cable TV system, embodying the principles of the invention. Headend 105 receives, among others, programming materials attributed to various program channels, and provides TV broadcast and other services, e.g., VOD services, to users at different user locations, including user locations 158-1 through 158-L in a neighborhood connected by the same service area node 105, where L represents an integer.

The programming materials are delivered from headend 105 to user locations 158 through "in-band" transmission channels provided by hybrid fiber coaxial (HFC) cable network 140. These transmission channels may comprise 6 MHz bands allocated for downstream communications of the programming materials from headend 105 to user locations 158. Quadrature amplitude modulation (QAM) modulator bank 168 in hub 120 modulates the downstream communications onto selected in-band transmission channels in accordance with a well known QAM scheme.

One or more service area nodes (e.g., 150) function as interfaces between user locations and network 140. At a user location, the aforementioned reception gateway is connected to one or more STTs. For example, user location 158-1, which may be a home, includes gateway 675 which may be installed inside or outside the home, and is connected to STT 676.

In addition to the in-band channels, data may be communicated downstream from headend 105 to user locations 158 via one or more forward data channels (FDCs). FDCs, sometimes referred to as "out-of-band" channels, typically are used to transport data, e.g., system messages, to user locations 158. In one embodiment, the FDCs may populate the 70-130 MHz band of a coaxial cable. Quaternary phase-shift keying (QPSK) modem pool 169 in hub 120 modulates downstream data onto selected FDCs in accordance with a well known QPSK scheme.

Data may be transmitted upstream from user locations 158 to headend 105 via one or more reverse data channels (RDCs), which populate a reverse passband, e.g., 5-40 MHz band, of a coaxial cable. Data carried in the RDCs is modulated in accordance with the QPSK scheme. QPSK modem pool 169 in hub 120 receives the QPSK signals in the RDC and performs any necessary demodulation before transmitting the signals to headend 105.

An STT at a user location may utilize an RDC for sending data including, e.g., user data, messages, etc., to headend 105. Using a contention-based access mechanism established by the Digital Audio Visual Council (DAVIC), a standard setting organization, each STT can share an RDC with other STTs in the network. This mechanism enables an STT to transmit upstream messages without a dedicated connection to a QPSK demodulator. The mechanism also provides equal access to the STTs that share the RDC, and enables detection and recovery from reverse path collisions that occur when two or more of the STTs transmit an upstream message simultaneously. As also specified by DAVIC, for communications purposes, network controller 125, and STTs, are individually identified by unique Internet protocol (IP) addresses assigned thereto. In this instance, e.g., STT 676 and gateway 675 may each be identified by an IP address. However, these IP addresses may be randomly assigned each time the broadband communication system is reconfigured. As a result, the IP address of an STT or that of a gateway or network controller 125 may change after a system reconfiguration. Nevertheless, network controller 125, an STT and a gateway in this instance are also assigned media access control (MAC) addresses on a permanent basis, surviving any system reconfiguration.

In this illustration, headend 105 includes digital TV program receiver 109, analog TV program receiver 110, analog signal processor 111, video-on-demand (VOD) server 119, network controller 125, switching unit 117, and resource manager 166. In a well-known manner, digital TV program receiver 109 receives TV programming material in digital format, e.g., an MPEG-2 format, from one or more digital program channel sources. Receiver 109 then provides to switching unit 117 the digital TV program streams, which may have been multiplexed to form one or more digital TV transport streams. Each transport stream may be identified by a unique transport stream identification (TSID). Each TV program stream within a transport stream may be identified by a program stream ID (PID).

Figure 3:
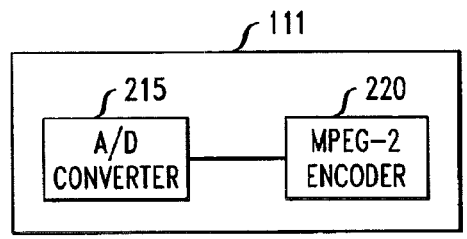
FIG. 3 illustrates components of an analog signal processor in the system of FIG. 2.

Analog TV program receiver 110 receives traditional analog TV programming material from one or more analog program channel sources. For example, in prior art, programming material from sixty analog program channels may require about 400 MHz bandwidth to convey the same. In accordance with the invention, such required bandwidth is reduced, e.g., to about 40 MHz, by digitizing and compressing the analog TV programming material. To that end, the received analog programming material is fed to analog signal processor 111 wherein, referring to FIG. 3, analog-to-digital (A/D) converter 215 digitizes the analog material in a conventional manner. The digitized analog TV programming material is encoded using MPEG-2 encoder 220 to effect data-compression thereof. The resulting MPEG-2 program streams containing the analog material may be encrypted in accordance with a conventional data encryption scheme to secure the programming content. The output of analog signal processor 111, hereinafter referred to as "digitized analog TV transport streams," is fed to switching unit 117.

Video-on-Demand (VOD) server 119, under the control of network controller 125, generates digital program streams containing programming material requested by users, e.g., movies requested through a VOD service. In one embodiment, VOD server 119 may generate transport streams, each comprising one or more program streams. The transport streams generated by VOD server 119, hereinafter referred to as "VOD transport streams," are fed to switching unit 117.

Figure 4:
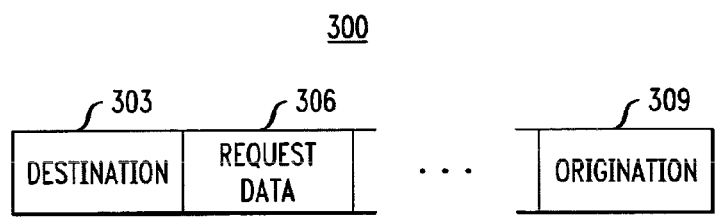
FIG. 4 illustrates a format of a request for a VOD program sent from a set-top terminal (STT) to a headend in the system of FIG. 2.

Network controller 125, among other tasks, receives requests from users for VOD services, and in response, causes VOD server 119 to generate one or more VOD transport streams containing the requested programming material. FIG. 4 illustrates a request (denoted 300) sent from an STT, e.g., STT 676, to network controller 125 via an RDC. As shown in FIG. 4, request 300 includes destination field 303 which in this instance contains the IP (and/or MAC) address of network controller 125 to which request 300 is destined; request data field 306 which contains data concerning the requested programming material, e.g., a movie; and origination field 309 which contains the IP (and/or MAC) address of the STT from which request 300 originates—in this instance, STT 676.

Figure 5:
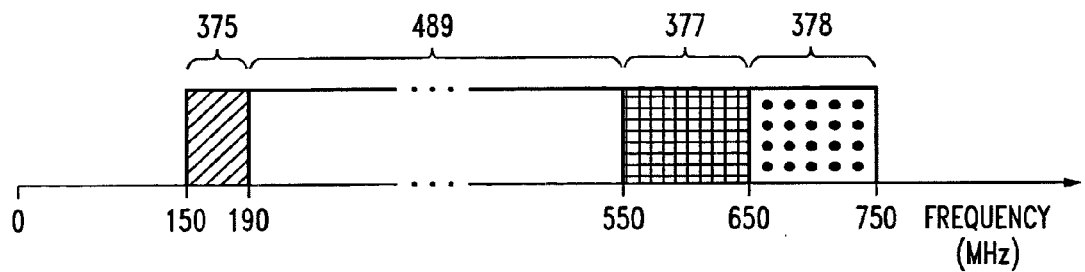
FIG. 5 illustrates an allocation of frequency bands for transmission of programming material in the system of FIG. 2.

Under the control of network controller 125, the transport streams from digital TV program receiver 109, analog signal processor 111, and VOD server 119 are switched by switching unit 117 to selected modulators in QAM modulator bank 168 in hub 120. The selected modulators modulate the respective transport streams onto various in-band transmission channels, e.g., according to the frequency band allocation illustrated in FIG. 5. In this example, as conventional, band 378 ranging from 650 MHz to 750 MHz is allocated for transmission of VOD transport streams, and band 377 ranging from 550 MHz to 650 MHz is allocated for transmission of digital TV transport streams. However, because of the above-described processing by analog signal processor 111 in accordance with the invention, the digitized analog TV transport streams require only a narrow band (denoted 375) ranging from, say, 150 MHz to 190 MHz, as opposed to prior art analog TV band 103 ranging from 150 MHz to 550 MHz, for transmission of the same amount of analog TV programming material. As a result, the band ranging from 190 to 550 MHz (denoted 489) which would otherwise be used for transmission of analog programming material in prior art is now made available for other use.

Figure 6:
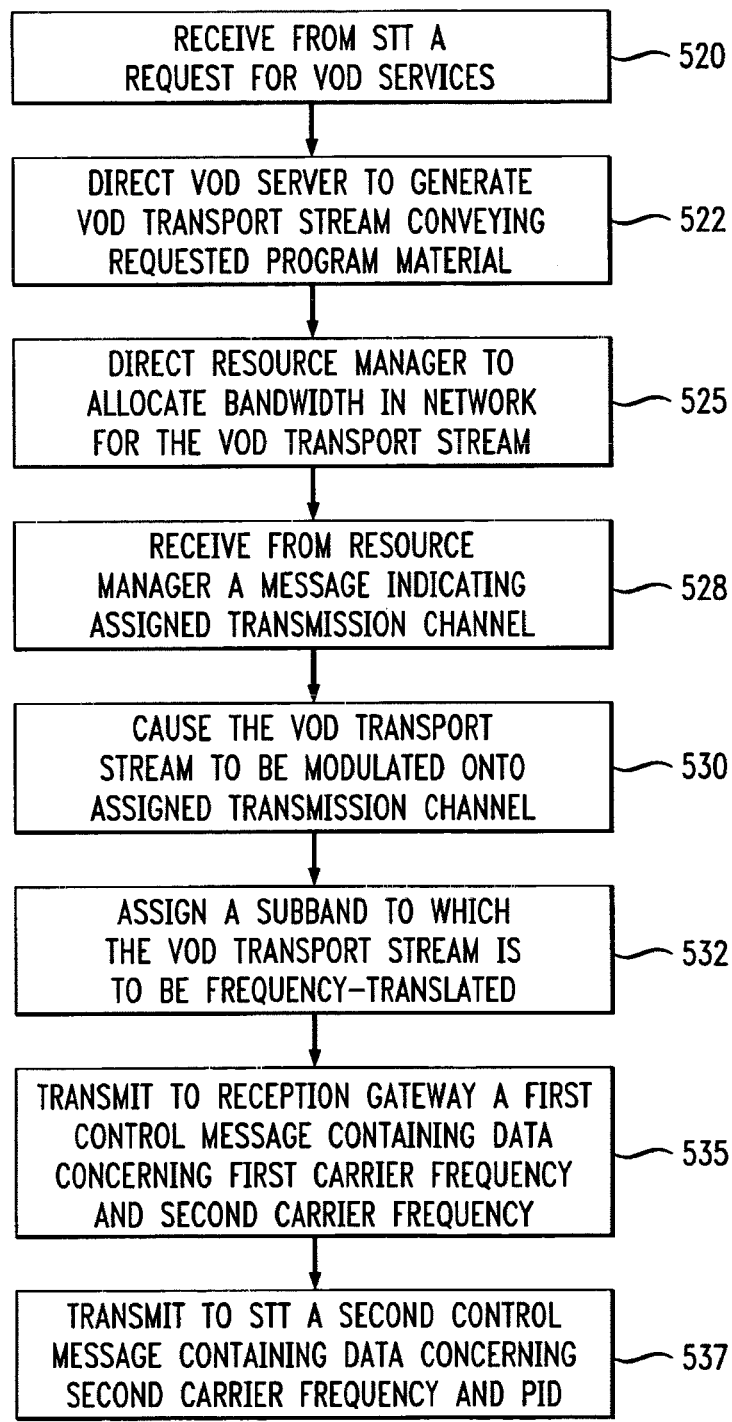
FIG. 6 is a flowchart depicting a routine for utilizing available bandwidth in a frequency band for non-VOD services in prior art to provide VOD services, in accordance with an embodiment of the invention.
Figure 9:
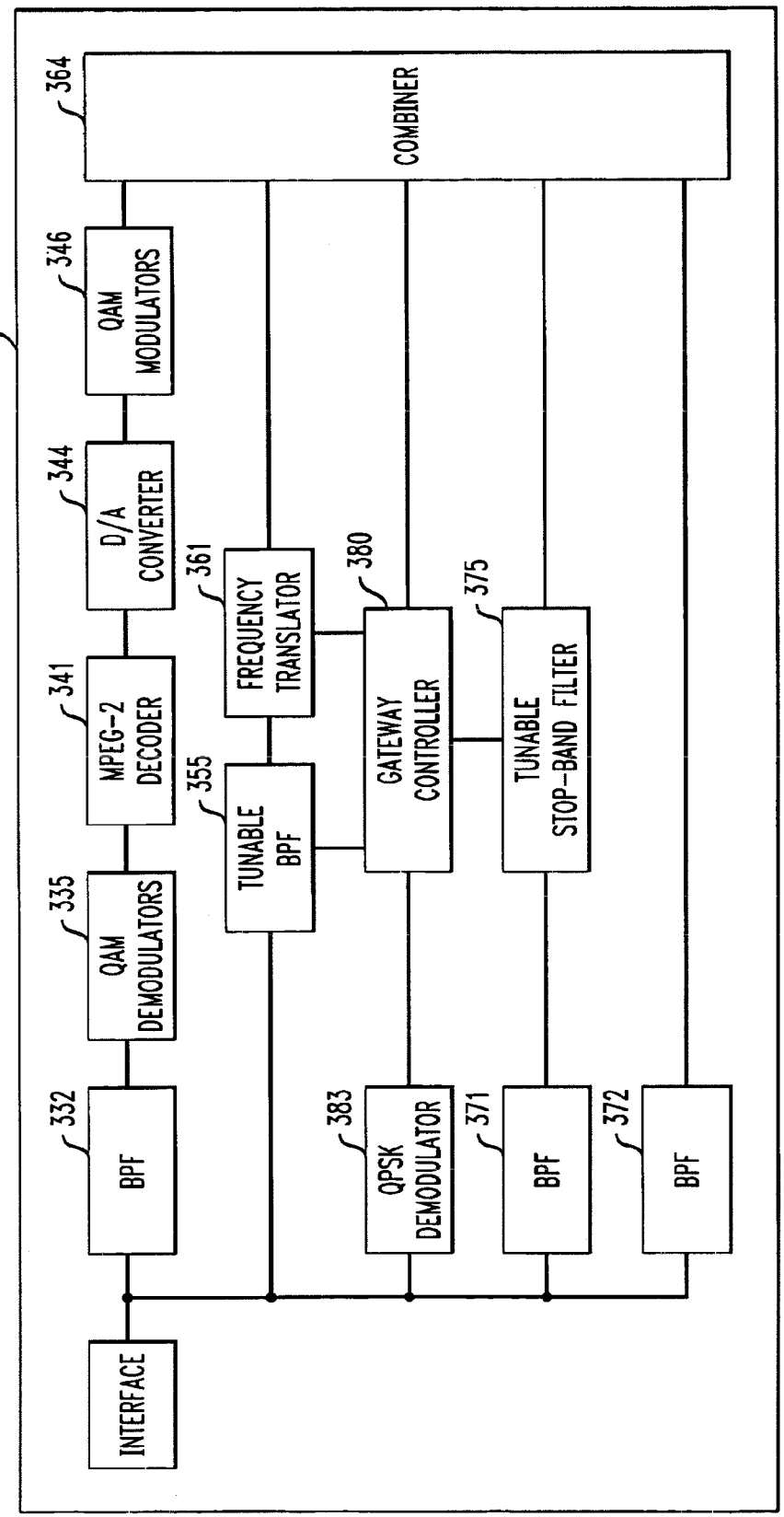
FIG. 9 is a block diagram of a reception gateway for performing, among others, the frequency translation of the VOD transport stream at the user location, in accordance with an embodiment of the invention.

In this illustrative embodiment, the "newly available" frequency band 489 is utilized to provide additional VOD services to users. FIG. 6 is a flowchart depicting a routine for utilizing band 489 to deliver additional VOD services. In this embodiment, network controller 125, at step 520, receives from an STT, e.g., STT 676, a request for VOD services. As an example, suppose that network controller 125 receives a VOD request for the movie, "Roman Holiday." In response, at step 522, controller 125 directs VOD server 119 to generate a VOD transport stream containing a program stream representing the Roman Holiday movie content. The VOD transport stream and the program stream are identified by a TSID and PID, respectively. The VOD transport stream is switched by switching unit 117 to QAM modulator bank 168.

At step 525, network controller 125 directs resource manager 166 to allocate bandwidth in network 140 for the VOD transport stream. To monitor and allocate bandwidth, resource manager 166 may maintain a resource table such as that shown in FIG. 7. Resource table 590 illustratively contains two columns, denoted 592 and 593. Column 592 contains an identifier of a transmission channel in the network, e.g., TC-1. Column 593 contains a TSID identifying a transport stream that is currently being transmitted via a respective transmission channel. Referring to row 596, for example, TC-1 is currently utilized to transmit the transport stream identified as TSID 17. A NULL value in column 593 indicates that a respective transmission channel is currently unused. Referring to row 597, for example, transmission channel TC-3 is currently unused.

In accordance with the invention, resource manager 166 may assign an unused transmission channel within band 489 for transmitting the aforementioned VOD transport stream, especially when no transmission channels in band 378 are available. Manager 166 informs network controller 125 of such an assignment. By way of example, resource manager 166 in this instance assigns transmission channel 376 (shown in FIG. 8A) spanning from 200 MHz to 206 MHz in band 489 for transmitting the VOD transport stream containing the Roman Holiday movie content. Thus, at step 528, network controller 125 receives from resource manager 166 a message indicating the assigned transmission channel 376. Network controller 125 directs switching unit 117 to switch the VOD transport stream to the proper modulator in bank 168 to modulate the VOD transport stream onto assigned transmission channel 376, as indicated at step 530.

Network controller 125 recognizes that the VOD transport stream transmitted through channel 376 in band 489 needs to be frequency-translated to another band at the user location in anticipation of reoccupation of band 489 by the original, analog TV program channel material there, recovered (and decompressed) from the digitized analog TV transport streams from narrow band 375. Such recovery, fully described below, involves gateway 675 performing on the digitized analog TV transport streams the inverse function to analog signal processor 111.

To realize the frequency translation of the VOD transport stream, controller 125 at step 532 in this instance assigns a 6 MHz subband within band 378 to which the VOD transport stream is to be frequency-translated at the user location. In this example, network controller 125 assigns subband 678 (illustrated in FIG. 8B) which spans from 650 MHz to 656 MHz. To select subband 678, network controller 125 considers whether any other VOD transport streams are currently transmitted to user location 158-1 through band 378, and selects the subband such that the frequency-translated VOD transport stream does not interfere with any such other VOD transport streams to user location 158-1.

At step 535, network controller 125 transmits to reception gateway 675 a first control message, containing data concerning a first carrier frequency, CF1, of the carrier carrying the VOD transport stream via transmission channel 376, and a second carrier frequency, CF2, of the carrier carrying the frequency-translated VOD transport stream through subband 678. At step 537, network controller 125 transmits to STT 676 a second control message, containing data concerning CF2 to which STT 676 should tune to receive the appropriate VOD transport stream, and a PID for STT 676 to extract therefrom the desired program stream, containing the Roman Holiday movie content in this instance.

Gateway 675 at user location 158-1 receives from node 150 a composite signal including respective signals from bands 375, 489, 377 and 378 containing analog program channel material, digital program channel material, and VOD programming material. FIG. 8 illustrates gateway 675 in accordance with the invention where the composite signal is received through interface 328. The composite signal is filtered by band-pass filter (BPF) 332 whose passband corresponds to narrow band 375 ranging from 150 MHz to 190 MHz in this instance. The output of BPF 332 is demodulated by QAM demodulators 335, resulting in baseband signals containing the digitized analog TV transport streams. MPEG-2 decoder 341 performs the inverse function to encoder 220 to decompress the digitized analog TV transport streams, resulting in the digitized analog TV programming material. Digital-to-analog (D/A) converter 344 performs the inverse function to A/D converter 215 to convert the digitized analog TV programming material back to its original analog form. The resulting analog TV programming material is modulated by QAM modulators 345 onto analog TV band 103, to which STT 676 may tune to obtain TV programs attributed to different analog program channels as in prior art.

Gateway controller 380 receives the aforementioned first control message from network controller 125 through an FDC via interface 328. The latter includes a QPSK demodulator (not shown) for demodulating the control message modulated onto the FDC. As mentioned before, the first control message contains data concerning CF1 and CF2. Based on such data, gateway controller 380 causes tunable BPF 355 to be tuned to CF1 to capture the VOD transport stream in the passband spanning from 200 MHz and 206 MHz in this instance. Controller 380 also causes frequency translator 361 to translate the output of filter 355 from CF1 to CF2. Translator 361 may first translate the filter output from CF1 to an intermediate frequency before ultimately to CF2, which is common. The output of translator 361 comprising the VOD transport stream, which occupies subband 678 spanning from 650 MHz to 656 MHz in this instance.

BPF 371 filters the composite signal from interface 328 to capture VOD transport streams in band 378 ranging from 650 MHz to 750 MHz. To not interfere with the frequency-translated VOD transport stream from translator 361, controller 380 causes tunable stop-band filter 375 to be tuned to CF2 to block any transport stream from BPF 371 occupying the same subband 678. Thus, in this instance, filter 375 has a stop-band spanning from 650 MHz to 656 MHz, corresponding to subband 678.

In addition, BPF 372 filters the composite signal from interface 328 to capture digital TV transport streams in band 377, ranging from 550 MHz to 750 MHz, to which STT 676 may tune to obtain TV programs attributed to different digital program channels as in prior art. Combiner 364 combines the outputs of QAM modulators 346, frequency translator 361, filter 375, and BPF 372, thereby presenting to STT 676 a combined signal containing transport streams according to the prior art frequency band allocation as in FIG. 1.

Figure 10:
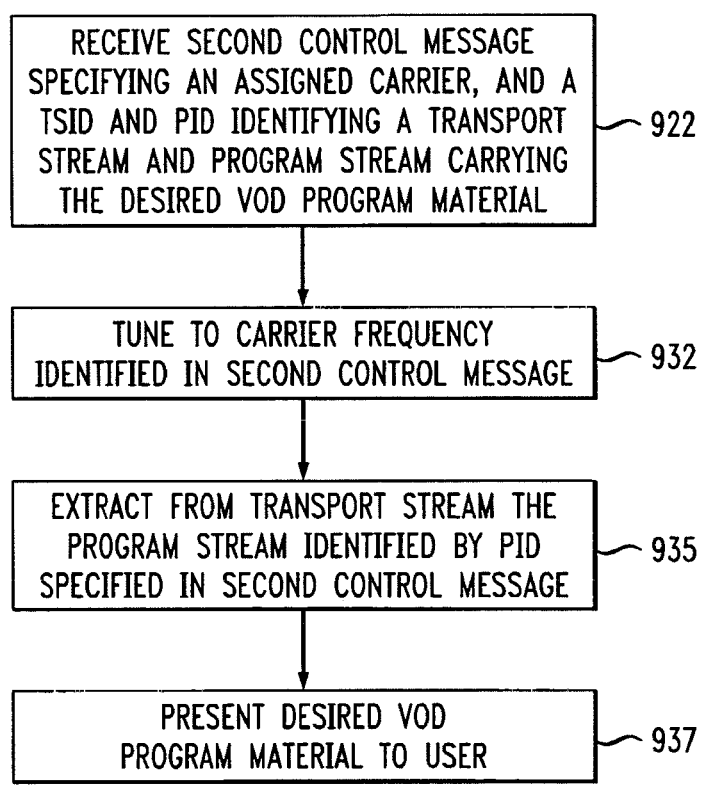
FIG. 10 is a flowchart depicting a routine for the STT to receive the requested VOD program contained in the VOD transport stream.

In particular, the combined signal contains the VOD transport stream in subband 678 which includes therein the program stream representing the Roman Holiday movie content, desired by the user at STT 676. STT 676 receives from network controller 125 the aforementioned second control message, as indicated at step 922 in FIG. 10. At step 932, STT 676 tunes to the carrier frequency CF2 identified in the second control message to receive the VOD transport stream in subband 678. At step 935, STT 676 extracts from the transport stream the program stream identified by the PID specified in the second control message. The identified program stream contains the desired VOD program material, i.e., the Roman Holiday movie content. At step 937, STT presents the desired VOD program material to the user by converting the extracted program stream to appropriate signals for the associated TV to play the VOD program.

The foregoing merely illustrates the principles of the invention. It will thus be appreciated that those skilled in the art will be able to devise numerous other arrangements which embody the principles of the invention and are thus within its spirit and scope.

For example, reception gateway 675 and STT 676 at a user location are disclosed herein as separate devices, it will be appreciated that gateway 675 may incorporate some or all of the functions of STT 676, or vice versa. Indeed, a person skilled in the art may integrate the two devices into one.

Further, system 100 and gateway 675 are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A communications apparatus comprising:
   an interface for receiving from a communications network at least first and second signals in a first frequency band, the first signals containing programming material and occupying part of the first frequency band;

a tunable bandpass filter coupled to said interface for passing signals in a first frequency sub-band, said first frequency sub-band being a portion of said first frequency band;

a frequency translator device coupled to said tunable bandpass filter for translating one or more second signals from the first frequency sub-band to a portion of a second frequency band;

a mechanism for converting the first signals to third signals, the third signals occupying the first frequency band in its entirety, wherein the third signals contain the same programming material as the first signals;

a tunable stop-band filter coupled to said interface for blocking frequencies in said portion of the second frequency band to which said frequency translator device translates said one or more second signals; and a combiner coupled to said mechanism for converting the first signals to third signals, said frequency translator device, and said tunable stop-band filter for combining signals generated by said frequency translator and signals passed by said tunable stop-filter.

2. The apparatus according to claim 1,
wherein the second frequency band is a frequency band which is outside said first frequency band; and
wherein the first signals represent digital data concerning the programming material.

3. The apparatus according to claim 2, wherein the third signals represent the programming material in an analog format.

4. The apparatus according to claim 2,
wherein said second frequency band is a frequency band that is indicated in a message received by said apparatus; and
wherein the mechanism includes a decoder for decompressing the digital data and a digital to analog converter for converting the decompressed digital data to an analog signal.

5. The apparatus according to claim 1, wherein the mechanism for converting the first signals to third signals, said frequency translator device, and said tunable stop band filter are arranged in parallel.

6. The apparatus according to claim 5, wherein said mechanism for converting the first signals to third signals, said frequency translator device and said tunable stop band filter provide signals in different frequency sub-bands to said combiner.

7. The apparatus according to claim 6,
wherein said apparatus is a reception gateway device at a user location having a connection to said communications network, said apparatus further including:
a gateway controller coupled to said frequency translator and said tunable stop-band filter, said gateway control being configured to control said frequency translator and said tunable stop-band filter based on a control message indicating said portion of the second frequency band.

8. The apparatus according to claim 1,
wherein the communications network includes a multi-channel delivery network;
wherein the multi-channel delivery network includes a cable TV network;
wherein the programming material is attributed to at least one analog TV program channel; and
wherein the second signals contain programming material attributed to a source other than the at least one analog TV program channel.

9. The apparatus according to claim 8, wherein the source provides on-demand programming material.

10. A system for processing at least analog signals representing programming material, transmission of the analog signals requiring first bandwidth of a communications network, the system comprising:
a mechanism for converting the analog signals to digital data representing the programming material, transmission of digital signals which contain the digital data requiring second bandwidth of the communications network, the second bandwidth being less than the first bandwidth;
an interface for transmitting the digital signals through a first subband in a first frequency band of the communications network, the first frequency band and the first subband having the first and second bandwidths, respectively, one or more selected signals being transmitted through a second subband in the first frequency band of the communications network, the first subband and the second subband being exclusive of each other, the selected signals being translated to a second frequency band outside the first frequency band after receipt of the selected signals from the communications network in anticipation of recovering the analog signals from the digital signals after receipt of the digital signals from the communications network; and
a network controller configured to send a command message to a gateway device which receives said digital signals via the first subband in the first frequency band, said command message indicating a first carrier frequency and a second carrier frequency, said first carrier frequency being in the first frequency band which is used to carry a video on demand transport stream sent in response to a request received from a user location at which said gateway device is located, said second carrier frequency to be used for carrying the video on demand transport stream when it is output by said gateway device.

11. The system according to claim 10, wherein the digital data is compressed.

12. The system according to claim 10, wherein the communications network includes a multi-channel delivery network.

13. The system according to claim 12, wherein the multi-channel delivery network includes a cable TV network.

14. The system according to claim 10, wherein the programming material is attributed to at least one analog TV program channel.

15. The system according to claim 14, wherein the selected signals contain programming material attributed to a source other than the at least one analog TV program channel.

16. The system according to claim 15, wherein the source provides on-demand programming material.

17. A system for providing analog program channel material to a device over a communications network, comprising:
a receiver for receiving first signals representing the analog program channel material;
a processor for converting the first signals to second signals representing the analog program channel material, transmission of the second signals requiring less bandwidth of the communications network than transmission of the first signals; and
a mechanism for transmitting the second signals and one or more selected signals in a first frequency band to the device, a message being sent to the device, the message containing information concerning a second frequency band to which a selected signal is translated after the device receives the selected signals; and a network controller configured to send a command message to a gateway device which receives said digital signals via the first subband in the first frequency band, said command message indicating a first carrier frequency and a second carrier frequency, said first carrier frequency being in the first frequency band which is used to carry a video on demand transport stream sent in response to a request received from a user location at which said gateway device is located, said a second carrier frequency to be used for carrying the video on demand transport stream when it is output by said gateway device.

18. The system according to claim 17, wherein a second message is sent to a terminal, the second message including information concerning the second frequency band from which the selected signal is obtained.

19. The system according to claim 17, wherein the device includes the terminal.

20. The system according to claim 17, wherein the communications network includes a multi-channel delivery network.

* * * * *